(12) United States Patent
Kim et al.

(10) Patent No.: US 9,574,511 B2
(45) Date of Patent: Feb. 21, 2017

(54) SYSTEM AND METHOD FOR A LOAD ANTICIPATION FEATURE AND ITS TUNING METHOD FOR A GENERATING SET

(71) Applicant: Basler Electric Company, Highland, IL (US)

(72) Inventors: Kiyong Kim, Collinsville, IL (US); Jeffrey A. Burnworth, Swansea, IL (US)

(73) Assignee: Basler Electric Company, Highland, IL (US)

( * ) Notice: Subject to any disclaimer, the term of this patent is extended or adjusted under 35 U.S.C. 154(b) by 0 days.

(21) Appl. No.: 14/718,504

(22) Filed: May 21, 2015

(65) Prior Publication Data

US 2016/0025023 A1    Jan. 28, 2016

Related U.S. Application Data

(60) Provisional application No. 62/028,653, filed on Jul. 24, 2014, provisional application No. 62/033,482, filed on Aug. 5, 2014.

(51) Int. Cl.
*F02D 41/08* (2006.01)
*F02B 63/04* (2006.01)
(Continued)

(52) U.S. Cl.
CPC ............ *F02D 41/083* (2013.01); *B60W 10/30* (2013.01); *B60W 20/108* (2013.01);
(Continued)

(58) Field of Classification Search
CPC ...... F02D 41/083; F02D 31/001; F02B 63/04; B60W 20/108; B60W 10/30; B60W 40/107; B60W 2510/0638; B60W 2510/081; B60W 2720/10; B60W 30/1884; H02P 9/02; Y10S 903/902
See application file for complete search history.

(56) References Cited

U.S. PATENT DOCUMENTS 4,563,734 A    1/1986    Mori et al.
5,124,626 A    6/1992    Thoen
(Continued)

OTHER PUBLICATIONS

European Search Report from corresponding European Application No. 15177844.6, dated Feb. 8, 2016.
(Continued)

*Primary Examiner* — Yuen Wong
(74) *Attorney, Agent, or Firm* — Polster Lieder Woodruff & Lucchesi, L.C.

(57) ABSTRACT

A method, system and computer software for providing a load anticipation feature for a diesel generating set including a diesel engine, a generator, a speed governor, and an automatic voltage regulator generator in a power system and computer data processor apparatus and computer executable instructions for ascertaining an equivalent linear speed control system whose response approximately matches the non-linear speed response of the diesel generating set; ascertaining at least one programmable parameter of the load anticipation feature based on a real power load applied to the diesel generating set and a desired speed response of the linear speed control system; generating a control output based on a measured real power load and at least one programmable parameter of the load anticipation feature; the speed governor receiving the control output and adjusting the speed of the diesel engine based on the control output.

26 Claims, 10 Drawing Sheets

(51) Int. Cl.
F02D 31/00 (2006.01)
B60W 20/00 (2016.01)
B60W 10/30 (2006.01)
B60W 30/188 (2012.01)
B60W 40/107 (2012.01)
H02P 9/02 (2006.01)

(52) U.S. Cl.
CPC ...... B60W 30/1884 (2013.01); B60W 40/107 (2013.01); F02B 63/04 (2013.01); F02D 31/001 (2013.01); H02P 9/02 (2013.01); B60W 2510/0638 (2013.01); B60W 2510/081 (2013.01); B60W 2720/10 (2013.01); Y10S 903/902 (2013.01)

(56) References Cited

U.S. PATENT DOCUMENTS

| | | | |
|---|---|---|---|
| 5,294,879 | A | 3/1994 | Freeman et al. |
| 5,691,896 | A | 11/1997 | Zou et al. |
| 6,125,077 | A | 9/2000 | Robinson et al. |
| 6,216,066 | B1 | 4/2001 | Goebel et al. |
| 6,396,236 | B1 | 5/2002 | Luukko |
| 6,549,858 | B1 | 4/2003 | Shelley et al. |
| 6,577,908 | B1 | 6/2003 | Wojsznis et al. |
| 6,697,767 | B2 | 2/2004 | Wang et al. |
| 6,700,356 | B1 | 3/2004 | Dorn |
| 6,760,716 | B1 | 7/2004 | Ganesamoorthi et al. |
| 7,024,253 | B2 | 4/2006 | Gaikwad et al. |
| 7,064,526 | B2 | 6/2006 | Patterson |
| 7,853,805 | B1 | 12/2010 | Srinivasa et al. |
| 8,024,682 | B2 | 9/2011 | McConaghy et al. |
| 8,275,488 | B2 | 9/2012 | Kim et al. |
| 8,866,626 | B2 | 10/2014 | Kim |
| 2002/0148438 | A1 | 10/2002 | Ellims et al. |
| 2003/0195641 | A1 | 10/2003 | Wojsznis et al. |
| 2005/0137834 | A1 | 6/2005 | Heydt et al. |
| 2005/0149209 | A1 | 7/2005 | Wojsznis et al. |
| 2007/0208677 | A1 | 9/2007 | Goldberg et al. |
| 2008/0036472 | A1 | 2/2008 | Collins, Jr. et al. |
| 2009/0198386 | A1* | 8/2009 | Kim ........................ H02P 9/102 700/298 |
| 2010/0026317 | A1 | 2/2010 | Collins, Jr. et al. |
| 2011/0166716 | A9 | 7/2011 | Rovnyak et al. |
| 2014/0015257 | A1 | 1/2014 | Dobbs |
| 2014/0172125 | A1* | 6/2014 | Shokooh ................ G05B 13/04 700/29 |

OTHER PUBLICATIONS

Chatterjee A. et al. "Transient performance improvement of grid connected hydro system using distributed generation and capacitive energy storage unit", International Journal of Electrical Power & Energy Systems, vol. 43, No. 1 (Dec. 2012) pp. 210-221, XP-002753026.
El-Zonkoly, A.M.; Optimal tuning of power systems stabilizers and AVR gains using particle swarm optimization, Expert Systems with Applications, vol. 31, Issue 3, Oct. 2006, pp. 551-557.
Biró et al.; On the Synchronous Machine Parameter Identification, Workshop on Electrical Machines' Parameters Technical University of Cluj-Napoca, May 26, 2001, pp. 87-90.
Eberhart et al.; A New Optimizer Using Particle Swarm Theory, Sixth International Symposium on Micro Machine and Human Science. Aug. 1995, pp. 39-43.
Flynn et al.; A Self-Tuning Automatic Voltage Regulator Designed for an Industrial Environment. IEEE Transaction on EnergyConversion. Jun. 1996, vol. 11, No. 2, pp. 429-434.
Sanchez et al.; Multi-objective pole placement with evolutionary algorithms. Lecture Notes in Computer Science, 4403 (2007), pp. 417-427.
Gaing Zwe-Lee; A Particle Swarm Optimization Approach for Optimum Design of PID Controller in AVR System. IEEE Transactions on Energy Conversion. Jun. 2004, vol. 19, No. 2, pp. 384-391.
International Search Report and Written Opinion from Corresponding PCT/US2009/032834 dated Mar. 12, 2009.
International Preliminary Report on Patentability from Corresponding PCT/US2009/32834 Dated Jun. 29, 2012.
Kanniah et al.; "Self-Tuning Regulator Based on a Dual-Rate Sampling": IEEE Transactions on Automatic Control; Aug. 1984; pp. 755-759; vol. AC 29, No. 8.
Kim et al.; Application of Swarm Intelligence to a Digital Excitation Control System, 2008 IEEE Swarm Intelligence Symposium; St. Louis, MO, Sep. 2008.
Kim et al.; "Turning a PID Controller for a Digital Excitation Control System" IEEE Transaction on Industry Applications; Mar./Apr. 2005; pp. 485-492; vol. 41, No. 2.
Kyriakides, Elias, Innovative Concepts for On-Line Synchronous Generator Parameter Estimation, Arizona State University Dec. 2003.
Melgoza et al.; Synchronous Machine Parameter Estimation Using the Hartley Series, IEEE Transactions on Energy Conversion, vol. 16, No. 1, Mar. 2001.
Perez, Joe; A Guide to Digital Fault Recording Event Analysis, ERL Phase Power Technologies, Winnipeg, Canada 2010 (Reprinted with permission from 2010 GA Tech Fault & Disturbance Analysis Conference).
North American Electric Reliability Corporation, Power System Model Validation, Princeton, NJ, Dec. 2010.
Mukherjee, et al.; Intelligent particle swarm optimized fuzzy PID controller for AVR system, Electric Power Systems Research, vol. 77, Issue 12, Oct. 2007, pp. 1689-1698.
Verbeek et al.; Determination of Synchronous Machine Parameters Using Network Synthesis Techniques, IEEE Transactions on Energy Conversion, vol. 14, No. 3, Sep. 1999.
Voda, et al.; A Method for the Auto-calibration of PID Controllers. Automatica. 1995. vol. 31. No. 1, pp. 41-53.
Amaya et al.; Identification of the Synchronous Machine Parameters by the Simulation of Time Domain Tests using Finite-Elements Method.
Suni et al.; On the Synchronous Generator Parameters Determination Using Dynamic Simulations Based on IEEE Standards.
International Search Report of the International Searching Authority from Corresponding PCT/US2012/063910, mailed Mar. 26, 2013.
Written Opinion of the International Searching Authority from Corresponding PCT/US2012/063910, mailed Mar. 26, 2013.
International Preliminary Report on Patentability from Corresponding PCT/US2012/063910 Dated May 13, 2014.
del Valle et al.; "Particle Swarm Optimization: Basic Concepts, Variants and Applications in Power Systems," Evolutionary Computation, IEEE Transactions on Voluntary Computation, vol. 12, No. 2, pp. 171-195, Apr. 2008.
Alrashidi et al.; "A Survey of Particle Swarm Optimization Applications in Electric Power Systems,", IEEE Transactions on Evolutionary Computation, vol. 13, No. 4, pp. 913-918, Aug. 2009.
Nasri et al; "A PSO-based optimum design of PID controller for a linear brushless DC motor", Proc. World Acad. Sci., Eng., Technol., vol. 20, pp. 211-215, 2007.

* cited by examiner

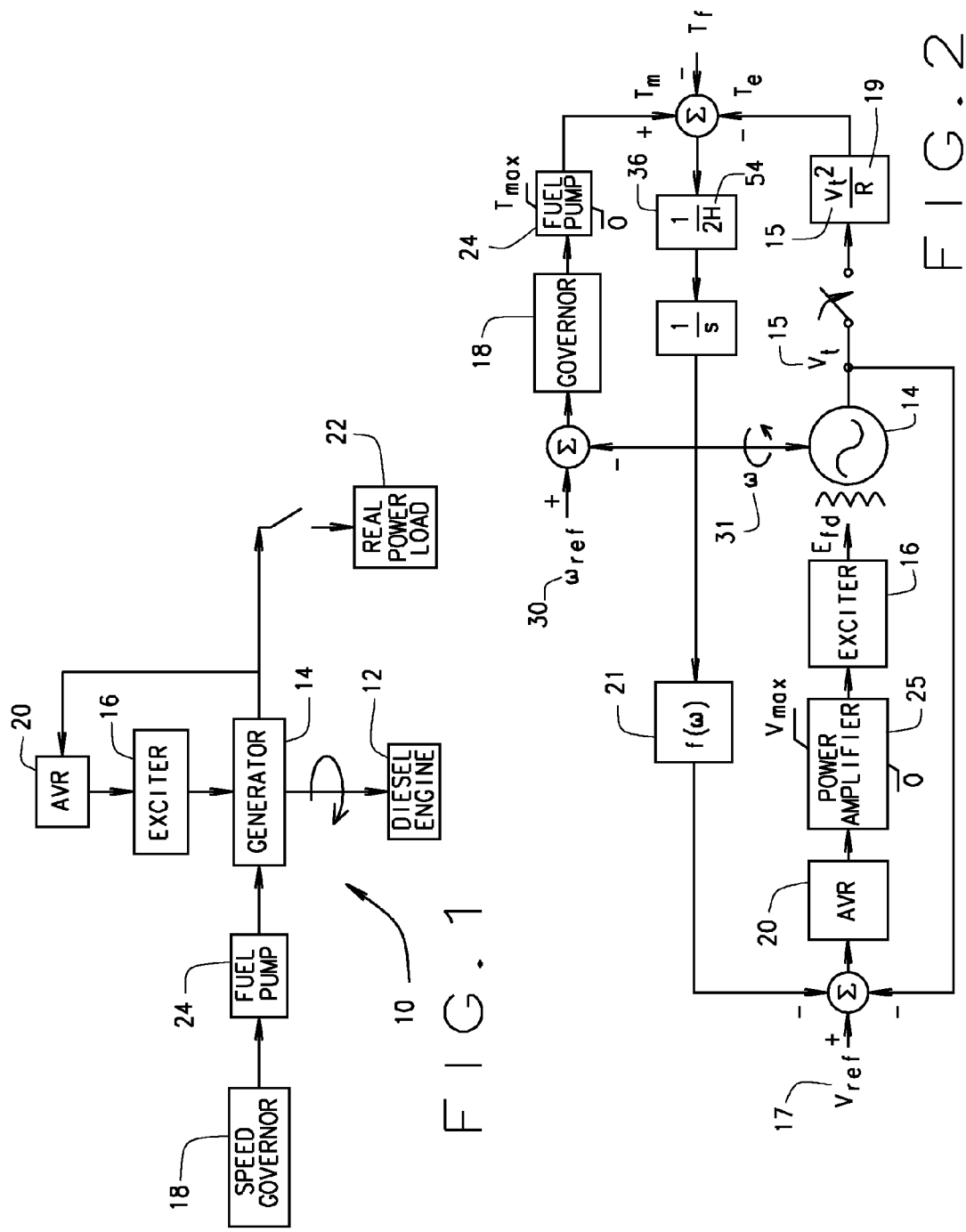

SYSTEM AND METHOD FOR A LOAD ANTICIPATION FEATURE AND ITS TUNING METHOD FOR A GENERATING SET

CROSS-REFERENCE TO RELATED APPLICATION

This application claims priority to U.S. Provisional Patent Application No. 62/028,653, filed on Jul. 24, 2014, and U.S. Provisional Patent Application No. 62/033,482, filed on Aug. 5, 2014, the disclosure of each is incorporated herein by reference in its entirety.

TECHNICAL FIELD

The present disclosure relates to alternating current power generators and, more specifically, to a system and method for load application performance of a diesel generating set.

BACKGROUND

Generating sets ("Gensets") are used to provide electricity for distributed power generation systems, which include prime power, standby generation, and network support. Deregulation of electrical utilities has resulted in many customers utilizing their standby diesel gensets to improve power quality or to avoid peak electricity tariffs.

Gensets often consists of a diesel engine, a synchronous machine, and two controllers (a speed governor and an automatic voltage regulator ("AVR")). Some of the modern microprocessor based AVR's are implemented with the Proportional, Integral, and Derivative (PID) control for stabilization and various supplemental control systems which include many limiters, VAR/PF controller, tuning functionality, protection and monitoring features.

The genset's output frequency is directly proportional to the diesel engine's speed. The speed governor seeks to maintain the diesel engine at a constant speed. The speed governor is designed to respond to changes in engine speed, acting as a feedback controller which controls the fuel rate to minimize a speed excursion due to a sudden change in the genset's real power load. Unlike the large size generators, many gensets may be expected to change operation from unloaded to full load in a single step load application, which causes large changes in engine speed or may cause the engine to stall.

International Standard ISO8528-5; 2013 provides a means to assess diesel genset performance, which classifies a genset based on a series of key performance indicators. For the modern gensets with G2 classification, the maximum voltage deviation from the nominal setpoint for a sudden load acceptance shall not exceed 20%, and the maximum electrical frequency deviation shall not exceed 10%. Voltage recovery time must be less than 6 seconds and frequency recovery time be less than 5 seconds. While some diesel genset controllers are able to meet the requirements of ISO8528-5; 2013, such controllers are expensive to manufacture.

A common way to reduce the engine speed drop is to provide an additional voltage dip during speed drops. Thus, faster engine speed recovery is achieved by reducing the real power load. Various voltage setpoint adjustments (underfrequency schemes) are used in modern AVR's. A load adjustment scheme has been suggested which temporarily reduces the voltage during a transient and therefore aids engine speed recovery. However, the speed governor's reaction to an engine speed change is much slower than the real power change. As such, the inventor hereof has identified a need for a system and method that can reduce the engine speed deviation of a genset when the real power load changes.

SUMMARY OF THE INVENTION

The present invention provides a method, system and computer software for providing a load anticipation feature for a diesel generating set including a diesel engine, a generator, a speed governor, and an automatic voltage regulator including the functions of ascertaining an equivalent linear speed control system, the response of the linear speed control system approximately matching the non-linear speed response of the diesel generating set and ascertaining at least one programmable parameter of a load anticipation feature based on a real power load applied to the diesel generating set and a desired speed response of the linear speed control system.

The system and method can also include the functions of measuring a real power load applied to the diesel generating set by a sensor electrically coupled to the diesel generating set, providing the at least one programmable parameter of the load anticipation feature to a computer data processor apparatus having computer memory, the computer memory containing computer executable instructions for implementing the equivalent linear speed control system and the load anticipation feature, the computer executable instructions for implementing the load anticipation feature including instructions to generate a control output based on the measured real power load and the at least one programmable parameter of the load anticipation feature. The system and method can further include providing the control output to the speed governor, the speed governor adjusting the speed of the diesel engine based on the control output.

BRIEF DESCRIPTION OF THE DRAWINGS

FIG. 1 is a block diagram of a diesel genset, according to an exemplary embodiment.

FIG. 2 is a functional block diagram showing the interaction between voltage control and speed control of the diesel genset, according to an exemplary embodiment.

DETAILED DESCRIPTION OF THE PREFERRED EMBODIMENT

Figure 3:
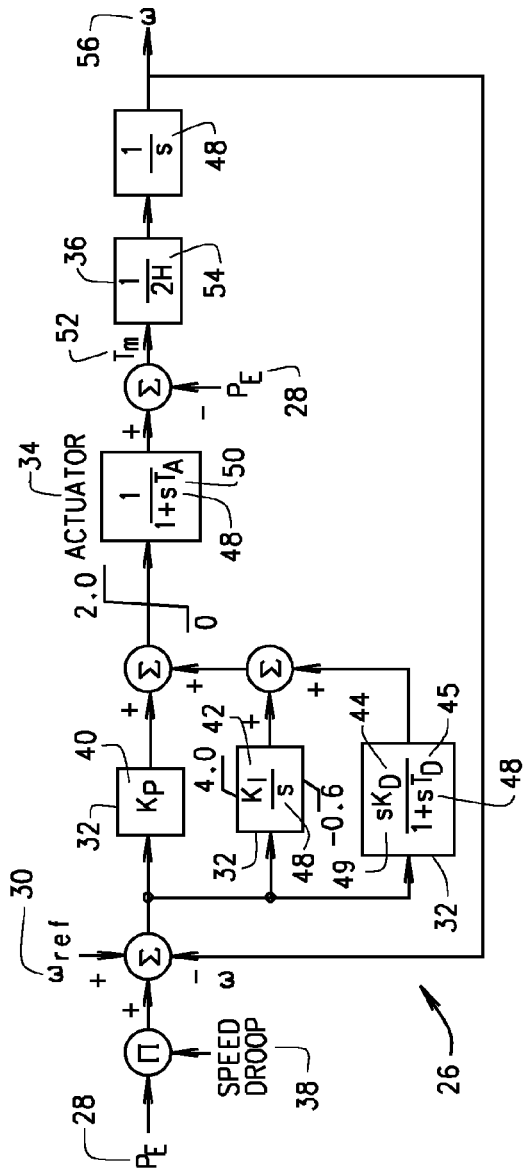
FIG. 3 is a functional block diagram of a model of an exemplary embodiment of an equivalent linear speed control system.

The following description is merely exemplary in nature and is not intended to limit the present disclosure or the disclosure's applications or uses.

The present system and method are applicable to a diesel genset 10, a block diagram of which is illustrated in FIG. 1. The diesel genset 10 can include a diesel engine 12, a synchronous machine, or generator, 14, an exciter 16, a speed governor 18 and an automatic voltage regulator ("AVR") 20. The diesel genset 10 can be connected to a real power load 22.

The interaction between voltage control and speed control of the diesel genset 10 is shown in the functional block diagram of FIG. 2. Each block in FIG. 2 represents a transfer function in the Laplace operator form. In the description that follows for FIGS. 2-3 and 6, the transfer function block(s) that are described are referenced by the part or a function or effect of the physical system, or by the function of software, that those blocks represent.

The input to the functional block diagram, $V_{ref}$ 17, is a constant that represents the desired generator voltage. The speed governor 18 can be operatively coupled to a fuel pump 24. The output of the fuel pump 24 block represents the mechanical torque, denoted as $T_m$. The electrical torque, $T_e$, can be determined based on the generator voltage 15, denoted as $V_t$ and the resistive load, R 19. The friction torque can be denoted as $T_f$. The speed governor 18 can include a communications interface for receiving a control output. The speed governor 18 can adjust the speed of the diesel engine 12 based in whole or in part on the received control output.

The total moment of inertia 36 can be determined in part based on the construction of the diesel engine 12 and the generator 14, including the rotating parts of each, and is represented as a function of the total engine inertia (H) 54. The AVR 20 can be operatively coupled to the exciter 16 through a power amplifier 25. The genset 10 desired speed response is represented as $\omega_{ref}$ 30. The actual desired speed response is represented as $\omega$ 31. A feedback signal, $f(\omega)$ 21, can be generated as a function of $T_m$, $T_f$, $T_e$, and H 54.

A sudden increase in the genset's 10 real power load 22 causes an increased load torque on the diesel engine 12. Since the load torque exceeds the diesel engine's 12 torque and the speed governor 18 cannot respond instantaneously, the engine speed decreases. After detecting this deceleration, the speed governor 18 can instruct the fuel pump 24 to increase the fuel supplied to the cylinders of the diesel engine 12. Since the generated voltage is proportional to the diesel engine's 12 speed, the generator 14 voltage is reduced due to armature reaction and internal voltage drops of the generator 14. The AVR 20 compensates for reduction in the generator 14 voltage by increasing the generator's 14 field current supplied by the exciter 16.

Since real power is proportional to the square of the voltage, a fast acting AVR 20 will significantly impede diesel engine 12 speed recovery by quickly recovering the voltage and therefore placing more load on the diesel engine 12. Thus, a speed governor 18 reaction to a speed change due to real power load 22 application is slower than of the real power change. In a modern AVR, a measurement of the real power load 22 is available. Thus, in order to reduce the speed deviation when a large real power load 22 is applied, a load anticipation feature ("LAF"), which adds a feed-forward signal proportional to the change in the real power load 22 to the speed governor 18 error summing point during the transient conditions, is more effective than the conventional approaches which change the setpoint of the AVR 20 based on a specific under frequency curve.

Particle Swarm Estimation

The Particle Swarm Optimization ("PSO") technique can be applied to estimate programmable parameters required to implement the LAF. PSO is an evolutionary computation technique inspired by the social behavior of bird flocking or fish schooling. In PSO, the potential particles (solutions) fly through the problem space by following the current optimum particles. Each particle keeps track of its coordinates in the problem space and communicates the best solution found to the other particles. This communication between particles allows an intelligent decision at each iteration to find the best possible solution for a given set of programmable parameters.

Determination of an Equivalent Linear Speed Control System

In order to implement the LAF, programmable parameters of an equivalent linear speed control system must be determined. A functional block diagram of the equivalent linear speed control system 26 is shown in FIG. 3, according to an exemplary embodiment. Each block in FIG. 3 represents a transfer function in the Laplace operator form. The equivalent linear speed control system 26 can include quantities representing a governor, actuator 34, engine combustion function, and moment of inertia 36. Engine performance is non-linearly affected by changes in operating speed, real power load and AVR response. Thus, in order to implement desired speed response of the generator speed control system including the LAF, an equivalent linear speed control system can be derived, the response of which approximately matches the nonlinear speed response of the actual diesel genset 10.

The generator 14 real power output $(P_E)$ 28 and the desired speed response $\omega_{ref}$ 30 are inputs to the equivalent linear speed control system 26. The equivalent linear speed control system 26 can include a Proportional, Integral, and Derivative (PID) controller 32 type of a speed governor 18, an actuator 34, a moment of inertia 36, and Speed Droop 38 as illustrated in FIG. 3. The (PID) controller 32 can include one or more programmable parameters. In the exemplary embodiment of FIG. 3, the (PID) controller 32 programmable parameters can include $K_P$ 40, $K_I$ 42, $K_D$ 44, and $T_D$ 45. $T_D$ 45 represents a derivative time constant which is a design constant for the PID. The term "s" 48 represents the Laplace operator. The actuator 34 can include an actuator time constant $(T_A)$ 50. The mechanical torque $(T_m)$ 52 can be determined as a function of the output of the actuator 34 and the generator 14 real power output ($P_E$) 28. The moment of inertia 36 of the diesel engine 12 can be represented as a function of the total engine inertia (H) 54. The output of the equivalent linear speed control system 26 can be w 56, which represents the desired speed response of the speed of the diesel engine 12.

Figure 4:
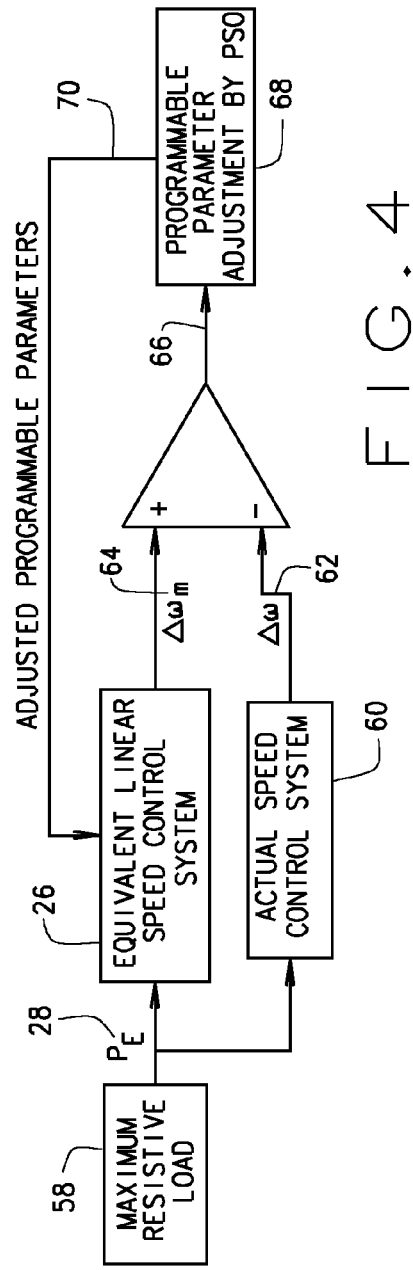
FIG. 4 is a block diagram of a procedure that can be used to identify the programmable parameters of the equivalent linear speed control system, according to an exemplary embodiment.

A block diagram of a procedure, according to an exemplary embodiment, that can be used to identify the programmable parameters of the equivalent linear speed control system 26 is illustrated in FIG. 4. A maximum resistive load 58 is applied to the diesel genset 10, and the generator 14 real power output ($P_E$) 28 and the response ($\Delta\omega$) 62 of the actual speed control system 60 are recorded every quarter cycle for a predetermined time.

The generator 14 real power output ($P_E$) 28 can also be used as an input to the equivalent linear speed control system 26, which produces an equivalent linear speed control system response ($\Delta\omega_m$) 64. The actual speed control system response ($\Delta\omega$) 62 and the equivalent linear speed control system response ($\Delta\omega_m$) 64 can be used to produce an input 66 to a Programmable Parameter Adjustment Rule by PSO 68 that can adjust the programmable parameters of the equivalent linear speed control system 26 using the PSO technique. As described more fully below, the Adjusted Programmable Parameters 70 can be provided to the equivalent linear speed control system 26. The equivalent linear speed control system response ($\Delta\omega_m$) 64 can be determined using the Adjusted Programmable Parameters 70. The foregoing process can be repeated until the equivalent linear speed control system response ($\Delta\omega_m$) 64 sufficiently matches the actual speed control system response ($\Delta\omega$) 62.

The Programmable Parameter Adjustment Rule by PSO 68 can be initialized with a group of five particles (solutions) based on the particular configuration (i.e. equipment size, equipment ratings) of the diesel genset 10, and then the Programmable Parameter Adjustment Rule by PSO 68 can search through the problem space for optima by following the optimum particles found so far. Each particle can include one or more programmable parameters, which coincide with the programmable parameters of the equivalent linear speed control system 26 model. In an exemplary embodiment, the programmable parameters can include H 54, $T_A$ 50, $K_P$ 40, $K_I$ 42, $K_D$ 44, and Speed Droop 38.

The equivalent linear speed control system 26 model's step response ($\Delta\omega_m$) 64, $\Delta\omega_m(k)$, can be calculated for k=1, ..., N where N is the total number of samples based on each particle and the generator 14 real power output ($P_E$) 28 samples described above. The equivalent linear speed control system 26 model's step response ($\Delta\omega_m$) 64 can be compared with the actual speed control system response ($\Delta\omega$) 62. A sampled value of the actual system response ($\Delta\omega$) at the k-stage can be denoted as $\Delta\omega(k)$. The fitness function to choose the best particle is the sum of the square of the differences between $\Delta\omega(k)$, and $\Delta\omega_m(k)$, k=1, ..., N as follows:

$$J = \sum_{k=1}^{N} (\Delta\omega(k) - \Delta\omega_m(k))^2 \qquad (1)$$

The fitness function is evaluated for the $\Delta\omega_m(k)$ 64 that results from each particle. Each time the fitness function is evaluated, $x_n^{self}$ value for each particle can be determined.

The resulting $x_n^{self}$ if values can be used to determine an $x^{global}$ value, which represents the best particle among all of the particles.

After finding the best values of one or more of the programmable parameters H 54, $T_A$ 50, $K_P$ 40, $K_I$ 42, $K_D$ 44, and Speed Droop 38, each particle updates its velocity and positions with the following equations:

$$v_{n+1} = \alpha v_n + \beta_1 \text{rand}_1 (x_n^{self} - x_n) + \beta_2 \text{rand}_2 (x^{global} - x_n) \qquad (2)$$

$$x_{n+1} = x_n + v_n \qquad (3)$$

In the above equations, $v_n$ is the particle velocity, $x_n$ is the current particle (solution), $x_n^{self}$ and $x^{global}$ are defined as best value for a particle and best value among all particles, respectively. $\alpha$ is an inertia weight which can represent the tendency to follow the direction that each particle moved during prior iterations. $\text{rand}_1$ and $\text{rand}_2$ are random numbers between 0 and 1. $\beta_1$ and $\beta_2$ are learning factors, which in conjunction with the inertia weight represents the tendency each particle to follow a new direction based on the $x_n^{self}$ and $x^{global}$ values.

For practical reasons, the boundaries of the search surface can be limited by clamping the values of the one or more programmable parameters of the equivalent linear control system 26 with the values listed in Table 1 below. If the value of any of the one or more programmable parameters fall below the corresponding Minimum Value shown in Table 1, the value of that programmable parameter is set to the corresponding Minimum Value. Similarly, if the value of any of the one or more programmable parameters exceeds the corresponding Maximum Value shown in Table 1, the value of that programmable parameter is set to the corresponding Maximum Value.

TABLE 1

| Search Space of Particle | | |
| --- | --- | --- |
| Control System Programmable Parameter | Minimum Value | Maximum Value |
| H | 0.01 | 2 |
| $T_A$ | 0.001 | 1 |
| $K_P$ | 0 | 10 |
| $K_I$ | 0 | 10 |
| $K_D$ | 0 | 10 |
| Droop | 0 | 0.1 |

Figure 5:
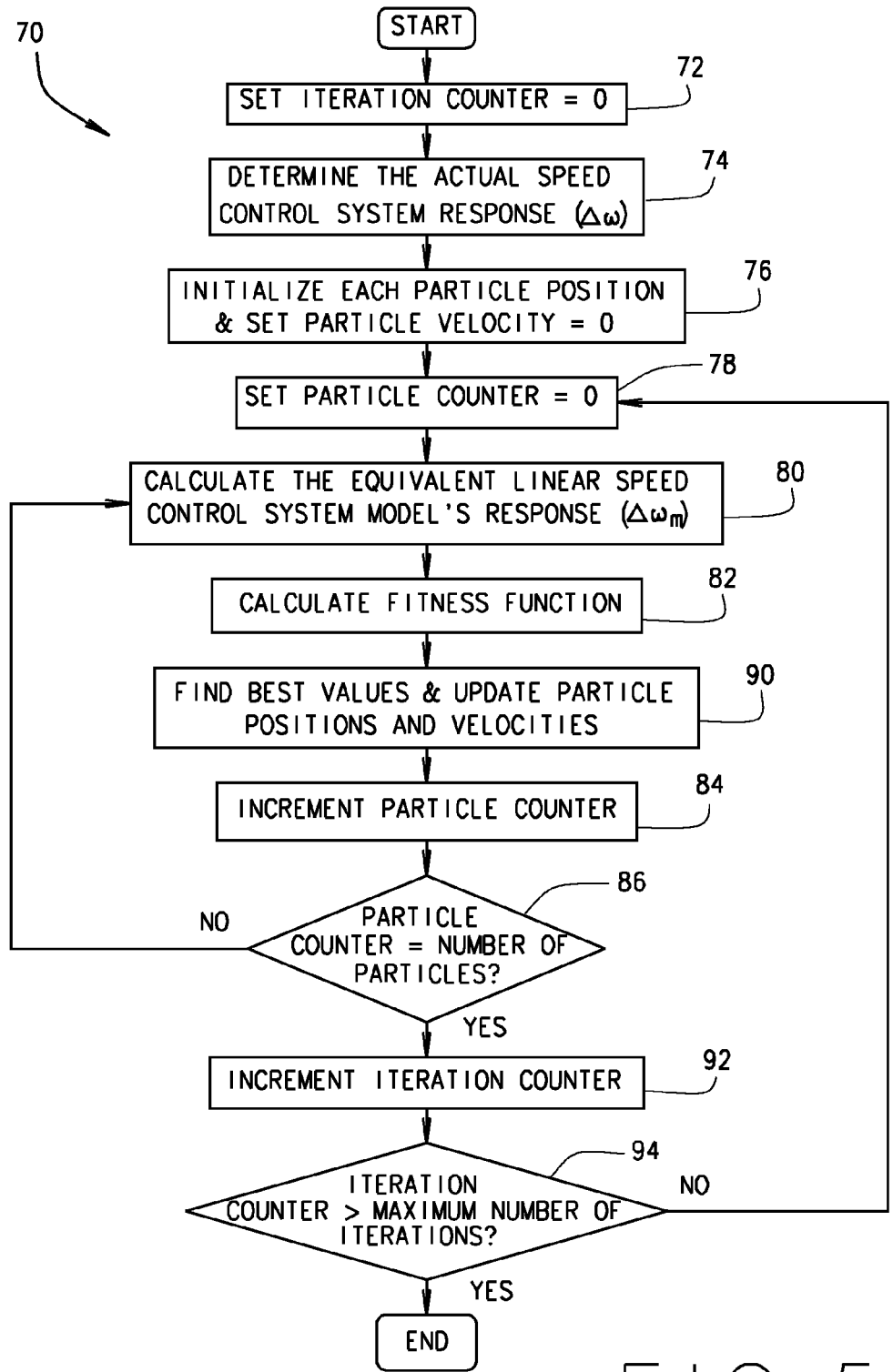
FIG. 5 is a flow chart of a system and method used to determine an equivalent linear control system for the diesel genset using Particle Swarm Optimization, according to an exemplary embodiment.

A computational procedure 70 for implementing the Programmable Parameter Adjustment Rule by PSO 68 is shown in FIG. 5, according to an exemplary embodiment. The steps of the computational procedure 70 are now described more fully.

Step 0 <72>: Set the Iteration Counter to zero.

Step 1 <74>: Determine the actual speed control system response ($\Delta\omega$) 62 by applying the generator 14 rated real power load as the real power load 22 and sampling the generator 14 real power output ($P_E$) 28 and the response ($\Delta\omega$) 62 of the actual speed control system 60 every quarter cycle for a predetermined sampling interval, such as five seconds. One skilled in the art will recognize that a shorter or longer sampling interval can be used without departing from the scope of the present disclosure. The resulting samples of the generator 14 real power output ($P_E$) 28 and the response ($\Delta\omega$) 62 of the actual speed control system 60 can be denoted respectively as $P_E(k)$ and $\Delta\omega(k)$, for k=1, ..., N, where N represents the total number of samples measured.

Step 2 <76>: Initialize each particle position based on the specifications of the equipment (i.e. equipment size, equipment ratings) in the diesel genset 10 and its velocity to zero.

Step 3 <78> Set the Particle Counter to zero.

Step 4 <80>: Calculate the equivalent linear speed control system model's response ($\Delta\omega_m$) 64 based on the generator 14 real power output ($P_E$(k)) 28, for the selected particle position $x_n$. The equivalent linear speed control system model's response ($\Delta\omega_m$) 64 can be denoted as $\Delta\omega_m$(k), for k=1, ..., N, where N represents the total number of samples measured. Each sample of $P_E$(k) produces a corresponding $\Delta\omega_m$(k).

Step 5 <90>: Calculate the fitness function, using equation (1) above, to choose the best $x_n^{self}$ value based on the actual speed control system response ($\Delta\omega$(k)) 62 obtained in Step 1 <74> and equivalent linear speed control system model's response ($\Delta\omega_m$(k)) 64 obtained in Step 4 <80>.

Step 6 <82>: Find the best $x_n^{self}$ value of the particle, update the $x^{global}$ value, update the particle position and velocity with equations (2), and (3) above, and, as described above.

Step 7 <84>: Increment the Particle Counter.

Step 8 <86>: If the Particle Counter is equal to the Number of Particles, go to Step 9 <92>. If not, go to Step 4 <80>.

Step 9 <92>: Increment the Iteration Counter.

Step 10 <94>: If the Iteration Counter exceeds the Maximum Number of Iterations terminate the computational procedure 70. If not, go to Step 3 <78>.

At the conclusion of the computational procedure 70, the one or more programmable parameters of the equivalent linear speed control system 26 have been determined.

Determination of the LAF Programmable Parameters

Figure 6:
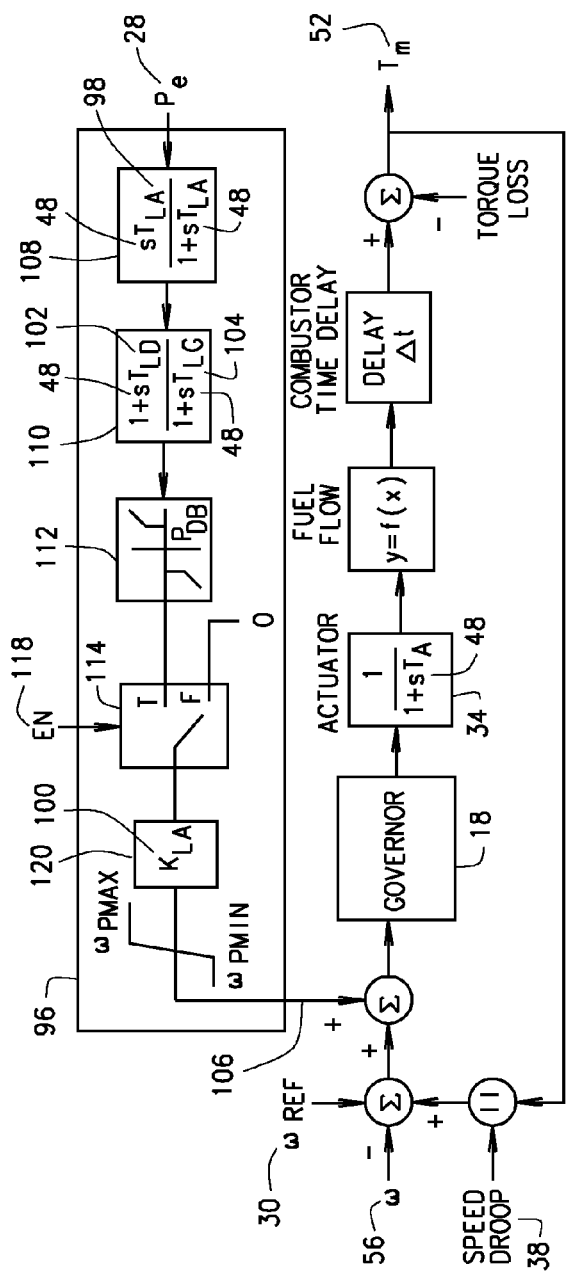
FIG. 6 is a functional block diagram of a Load Application Feature (LAF) modifier to an equivalent linear speed control system, according to an exemplary embodiment.

FIG. 6 shows a functional block diagram of an exemplary embodiment of a diesel genset 10 speed control system modified by a LAF 96. Each block in FIG. 6 represents a transfer function in the Laplace operator form. The LAF 96 is a controller modifier to the governor that becomes enabled when the rate of change in the real power load 22 is greater than a programmable amount. The programmable amount can be determined based on the speed response of the diesel genset 10 to real power load 22 variations with the LAF disabled. Typically, the programmable amount can be 80% of the generator's 14 real power rating, though other higher or lower values can be used without departing from the scope of the present disclosure. Lower values of the programmable threshold can be used if it is desired that the LAF 96 be active for lower percentages of the generator's 14 real power rating.

The LAF 96 adds a feed-forward signal 106 proportional to the real power load 22 change to the speed governor 18 error summing point during transient conditions. The rate of change in the real power load 22 can be obtained with a wash-out filter 108. The phase lag due to the speed governor 18 and the actuator 34 can be compensated for with a phase lead filter 110. A dead-zone block 112, which can have an input from the wash-out filter 108 or the phase lead filter 110, can be utilized to make the LAF 96 active only if the rate of change in the real power load 22 exceeds an upper programmable threshold. Preferably, the dead-zone block 112 disables the LAF 96 when the absolute value of its input falls below a programmable threshold. The programmable threshold of the dead-zone block 112 can typically be 10% of the generator's 14 real power rating per second. One skilled in the art will recognize that other values, which may or may not depend on the generator's 14 real power rating, can be used without departing from the scope of the present disclosure. The LAF 96 can include an enable block 114, which can be used to disable the LAF 96 based on an enable input 118 (EN). The LAF 96 can also include a signal amplifier 120, which has an output gain 100 ($K_{LA}$).

The exemplary embodiment of FIG. 6 can be used for estimation of one or more LAF 96 programmable parameters. The one or more LAF 96 programmable parameters can include the washout time constant 98 ($T_{LA}$), the output gain 100 ($K_{LA}$), the phase lead constant 102 ($T_{LD}$), and the lag time constant 104 ($T_{LG}$). The ability of the LAF 96 to achieve the desired speed response of the equivalent linear speed control system 26 depends on the values of these programmable parameters. PSO can be utilized to find a proper set of the LAF 96 programmable parameters. The equivalent linear speed control system 26 identified above is utilized to find a set of optimized LAF 96 programmable parameters.

Figure 7:
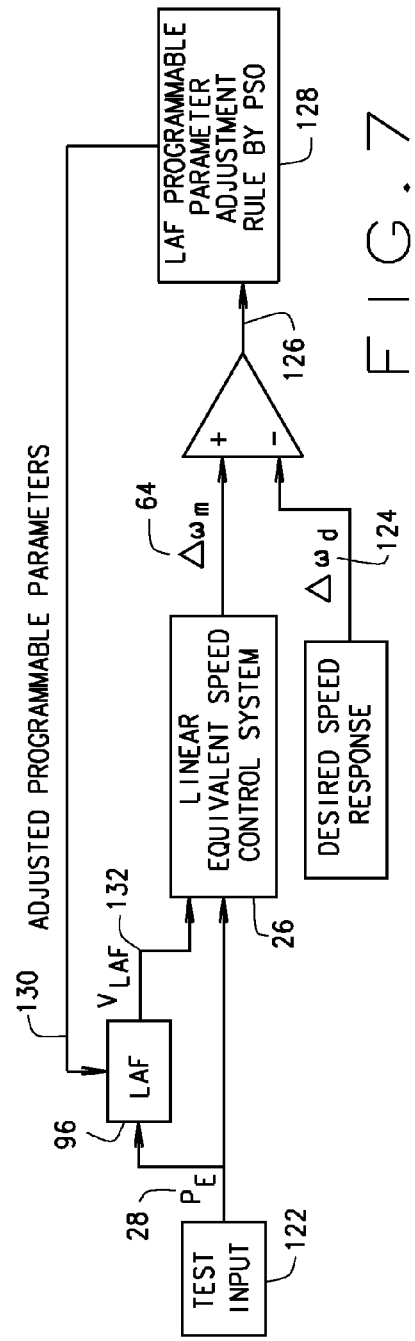
FIG. 7 is a block diagram for illustrating a procedure for the estimation of the LAF programmable parameters, according to an exemplary embodiment.

A functional block diagram of a procedure, according to an exemplary embodiment, that can be used to identify the programmable parameters of the LAF 96 is illustrated in FIG. 7. A maximum resistive load 122 is applied to the diesel genset 10, and the generator 14 real power output ($P_E$) 28 is recorded every quarter cycle for a predetermined amount of time. The generator 14 real power output ($P_E$) 28 can be used as an input to the LAF and the equivalent linear control system model 26. The desired speed response 124 can be determined based on the actual speed measurement ($\Delta\omega$) and the scaling factor ($K_{desired}$) using the following equation:

$$\Delta\omega_d(t) = K_{desired}\Delta\omega(t) \qquad (4)$$

The equivalent linear speed control system response ($\Delta\omega_m$) 64 can be determined based on the generator 14 real power output ($P_E$) 28. The desired speed response ($\Delta\omega_d$) 124 and the equivalent linear speed control system response ($\Delta\omega_m$) 64 can be used to produce an input 126 to a LAF Programmable Parameter Adjustment Rule by PSO 128 that can adjust the programmable parameters of the LAF 96 using the PSO technique. As described more fully below, the Adjusted Programmable Parameters 130 can be provided to the equivalent linear speed control system 26. The equivalent linear speed control system response ($\Delta\omega_m$) 64 can be determined using the Adjusted Programmable Parameters 130. The foregoing process can be repeated until the equivalent linear speed control system response ($\Delta\omega_m$) 64 sufficiently matches the desired speed response ($\Delta\omega_d$) 124. The output of the LAF 96, $V_{LAF}$ 132 can be determined based on the generator 14 real power output ($P_E$) 28 and the Adjusted Programmable Parameters 130.

The LAF Programmable Parameter Adjustment Rule by PSO 128 can be initialized with a group of five particles (solutions) with particle values selected randomly within the search space. The LAF Programmable Parameter Adjustment Rule by PSO 128 then searches through the search space for optima by following the optimum particles found so far. The equivalent linear speed control system response ($\Delta\omega_m$) 64 can be calculated based on the equivalent linear speed control system 26, each particle and samples of the generator 14 real power output ($P_E$) 28. The resulting calculated values of the equivalent linear speed control system response ($\Delta\omega_m$) 64 can be denoted as $\Delta\omega_m$(k). A desired value of the desired speed response ($\Delta\omega_d$) 124 at the k-stage can be denoted as $\Delta\omega_d$(k). The resulting calculated values can be compared with the desired speed response $\Delta\omega_d$(k). The fitness function to choose the best particle is the sum of the square of the differences between $\Delta\omega_d$(k) and $\Delta\omega_m$(k), k=1, ..., N as follows:

$$J = \sum_{k=1}^{N} (\Delta\omega_d(k) - \Delta\omega_m(k))^2 \quad (5)$$

After finding the best values of the one or more LAF 96 programmable parameters, $T_{LA}$ 98, $K_{LA}$ 100, $T_{LD}$ 102, $T_{LG}$ 104, each particle updates its velocity and positions with the following equations:

$$v_{n+1} = \alpha v + \beta_1 \text{rand}_1(x_n^{self} - x_n) + \beta_2 \text{rand}_2(x^{global} - x_n) \quad (6)$$

$$x_{n+1} = x_n + v_n \quad (7)$$

In the above equations, $v_n$ is the particle velocity, $x_n$ is the current particle (solution), $x_n^{self}$ and $x^{global}$ are defined as best value for a particle and best value among all particles, respectively. $\alpha$ is an inertia weight which can represent the tendency to follow the direction that each particle moved during prior iterations. $\text{rand}_1$ and $\text{rand}_2$ are random numbers between 0 and 1. $\beta_1$ and $\beta_2$ are learning factors, which in conjunction with the inertia weight represents the tendency each particle to follow a new direction based on the $x_n^{self}$ and $x^{global}$ values. It should be noted that the $\alpha$, $\beta_1$, and $\beta_2$ values utilized in the determination of the one or more LAF 96 programmable parameters differ from those used to determine the programmable parameters of the equivalent linear speed control system 26 described above.

For practical reasons, the boundaries of the search surface can be limited by clamping the values of the one or more LAF 96 programmable parameters with the values listed in Table 2 below. If the value of any of the one or more programmable parameters fall below the corresponding Minimum Value shown in Table 2, the value of that programmable parameter is set to the corresponding Minimum Value. Similarly, if the value of any of the one or more programmable parameters exceeds the corresponding Maximum Value shown in Table 2, the value of that programmable parameter is set to the corresponding Maximum Value.

TABLE 2

Search Space of Particle

| LAF Programmable Parameter | Minimum Value | Maximum Value |
|---|---|---|
| $T_{LA}$ | 0.01 | 1 |
| $K_{LA}$ | 0.01 | 1 |
| $T_{LD}$ | 0 | 1 |
| $T_{LG}$ | 0 | 1 |

Figure 8:
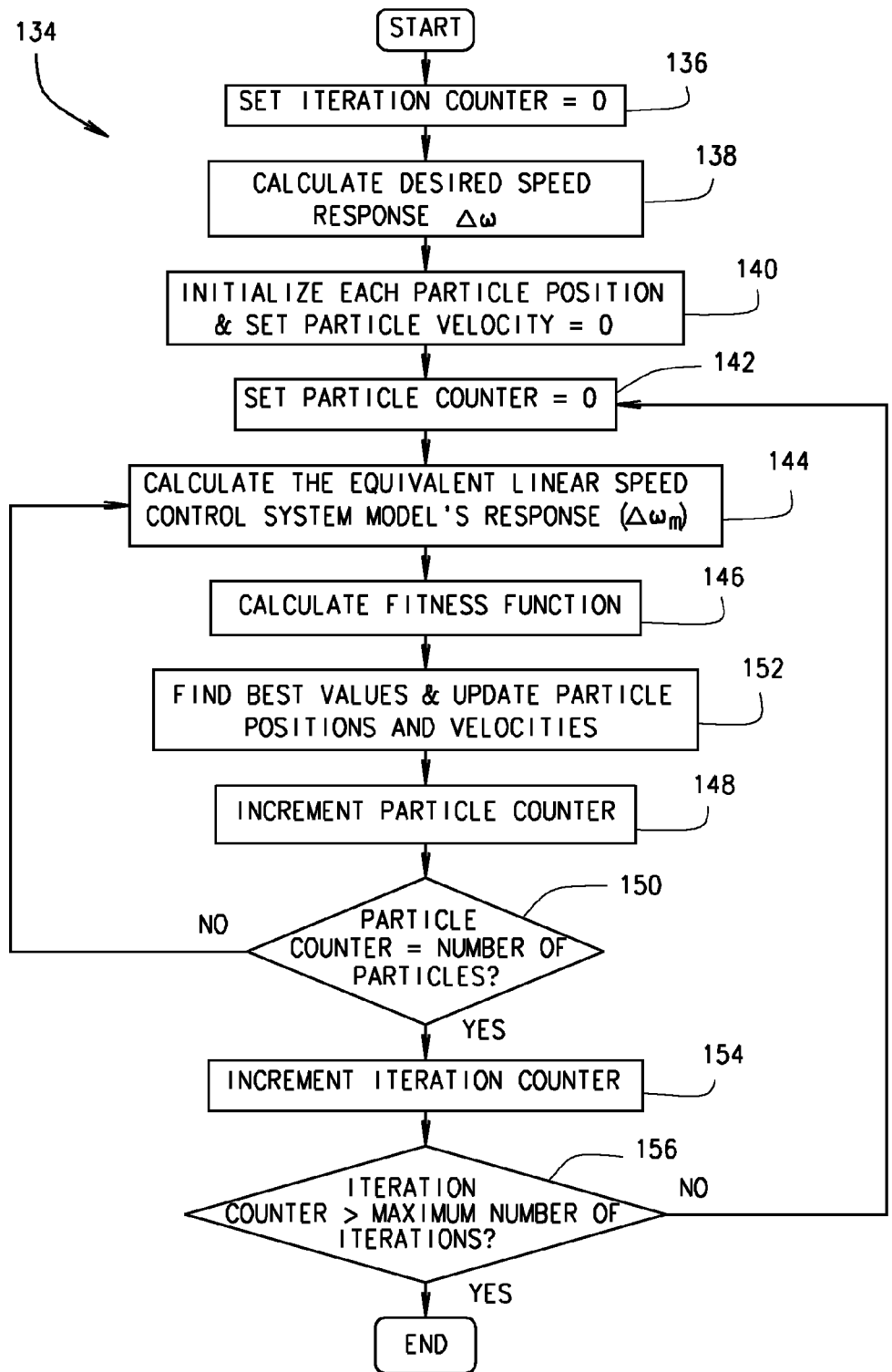
FIG. 8 is a flow chart of a system and method used to estimate programmable parameters for the LAF using Particle Swarm Optimization, according to an exemplary embodiment.

A computational procedure 134 for implementing the LAF Programmable Parameter Adjustment Rule by PSO 128 is shown in FIG. 8, according to an exemplary embodiment. The steps of the computational procedure 134 are now described more fully.

Step 0 <136>: Set the Iteration Counter to zero.

Step 1 <138>: Record each calculated values every quarter cycle for a predetermined sampling interval, such as five seconds, using above equation (4) and calculate the desired speed response ($\Delta\omega_d$) 124. One skilled in the art will recognize that a shorter or longer sampling interval can be used without departing from the scope of the present disclosure. The resulting samples of the desired speed response $\Delta\omega_d$ can be denoted as $\Delta\omega_d(k)$, for k=1, . . . , N, where N represents the total number of samples recorded.

Step 2 <140>: Initialize each particle position and its velocity to zero.

Step 3 <142> Set the Particle Counter to zero.

Step 4 <144>: Calculate the equivalent linear speed control system model's response ($\Delta\omega_m$) 64 based on the generator 14 real power output ($P_E(k)$) 28, for the selected particle position $x_n$. The equivalent linear speed control system model's response ($\Delta\omega_m$) 64 can be denoted as $\Delta\omega_m(k)$, for k=1, . . . , N, where N represents the total number of samples measured. Each sample of $P_E(k)$ produces a corresponding $\Delta\omega_m(k)$.

Step 5 <146>: Calculate the fitness function, equation (5), to choose the best, value based on the desired speed response ($\Delta\omega_d$) 124 obtained in Step 1 <138> and the equivalent linear speed control system model's response ($\Delta\omega_m$) 64 obtained in Step 3 <142>.

Step 6 <152>: Update the particle position and velocity with equations (6) and (7) above, and update the $x^{global}$ value, as described above.

Step 7 <148>: Increment the Particle Counter.

Step 8 <150>: If the Particle Counter is equal to the Number of Particles, go to Step 9 <154>. If not, go to Step 4 <144>.

Step 9 <154>: Increment the Iteration Counter.

Step 10 <156>: If the Iteration Counter exceeds the Maximum Number of Iterations terminate the computational procedure 134. If not, go to Step 3 <142>.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

Implementation of the LAF Systems and Methods

In order to show its effectiveness and applicability to industrial environment, the system and method were implemented into an available commercial AVR developed for a small size generator set (less than 10 MVA). In general, this type of regulator has been designed cost-effectively and the size of memory and computation power are limited.

The AVR consists of a microprocessor and signal conditioning circuits for generator voltage, current, and PWM controlled regulator output. The generator voltage and current are sampled with 12 bits resolution after anti-aliasing filters. The rms calculation of generator voltage is calculated every quarter cycle (4.16 msec for 60 Hz system).

In order to provide a simple user interface to the AVR with self-tuning feature, a software application was developed. The following features are implemented in the software application:

1. Basic diagnostic functions (wiring validation and metering calibration).

2. Capability to record the generator real power and speed responses over a fixed time period when the real power load is applied.

3. Capability to identify an equivalent speed control system using the PSO technique.

4. Capability to generate the desired speed response $\Delta\omega_d$.

5. Capability to estimate the LAF parameters to match the speed of the equivalent system with LAF to the desired speed response obtained in step 4.

6. Capability to set the LAF parameters and verify the speed response is approximately equal to the desired response.

A field engineer can activate the self-tuning mode of the software application and the LAF parameters can be calculated for a desired value of $K_{desired}$.

Figure 9A:
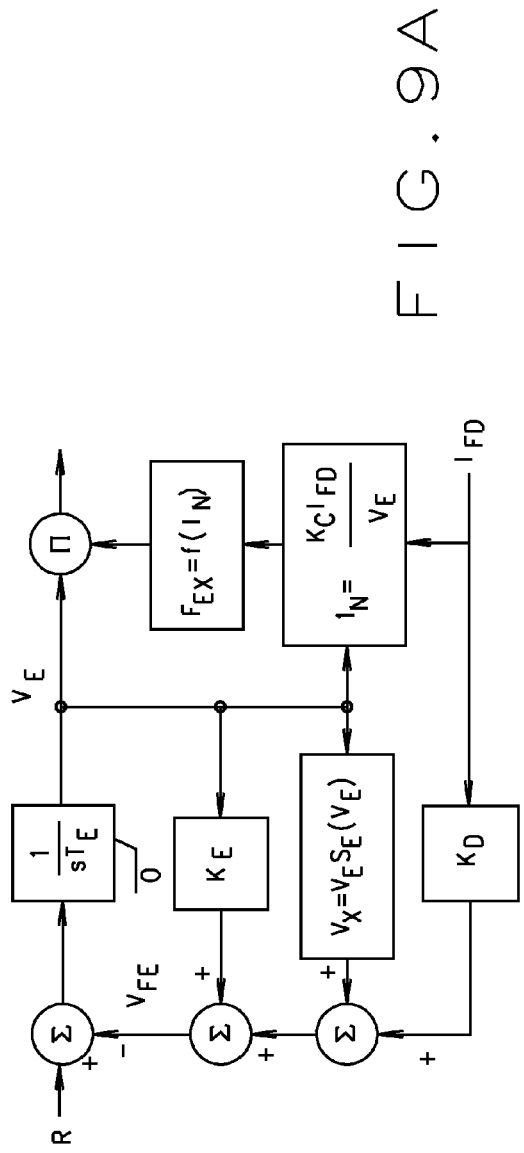
FIGS. 9A and 9B are functional block diagrams of a representation of the alternator-rectifier exciter and engine, according to an exemplary embodiment.
Figure 9B:
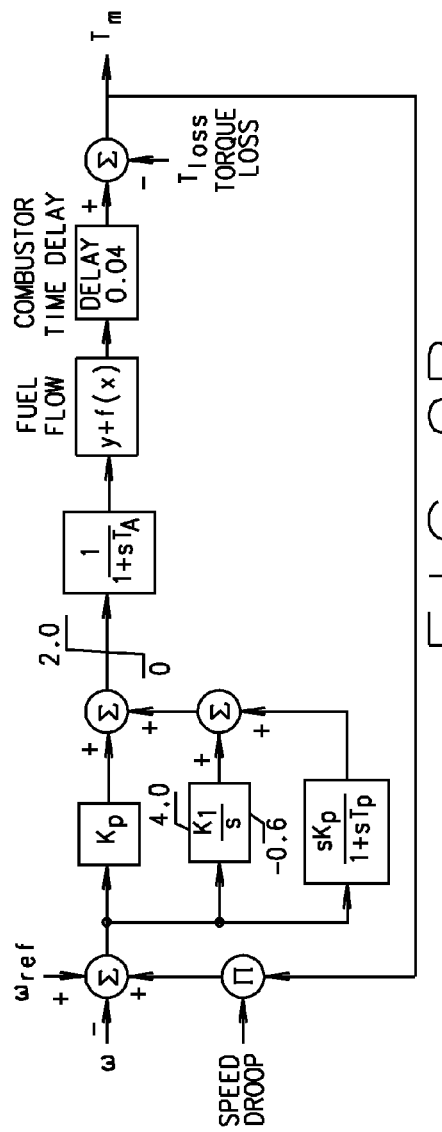

A Real Time Digital Simulator (RTDS) was utilized to verify the performance of the previously disclosed system and method. A full detailed generator model in the RTDS library can be used as part of the performance verification. A representation of the alternator-rectifier exciter and engine are shown as functional block diagrams FIGS. 9A and 9B. An AVR within which the previously disclosed system and method were implemented was also connected to RTDS.

The RTDS, including an embodiment of the LAF systems and methods described above, can be implemented using MATLAB® software to simulate the LAF systems and methods, and BESTCOMPLUS® software can be used to communicate with a test device to acquire necessary test results. One skilled in the art will realize that other suitable means can be used to implement the RTDS, including but not limited to, custom developed software running on commercially available hardware and operation systems, and other suitable communication software.

Figure 10:
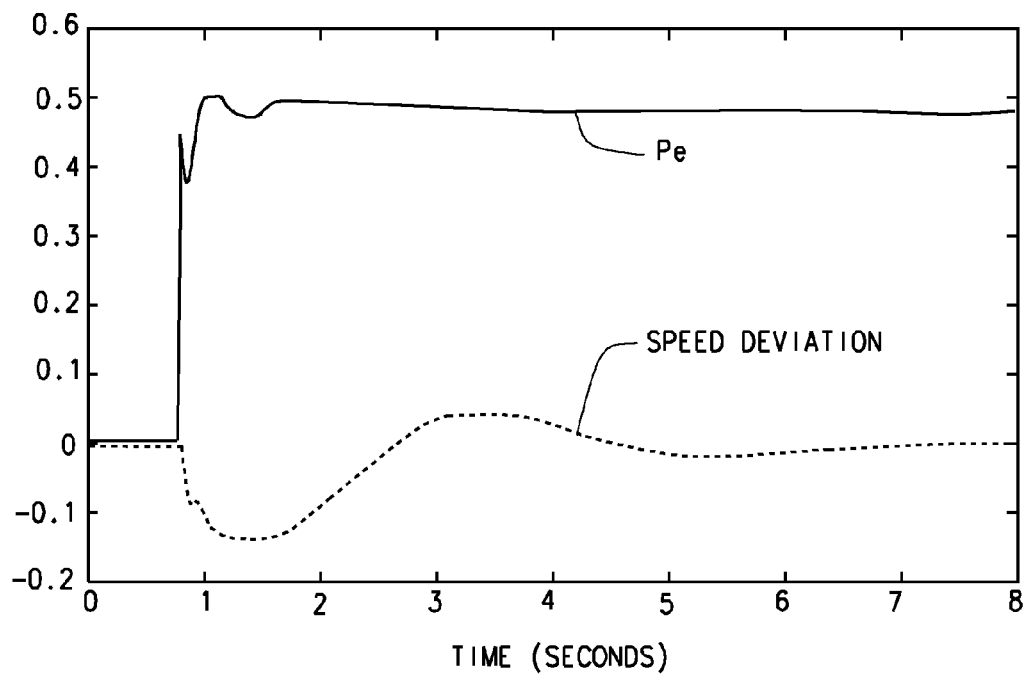
FIG. 10 shows an actual, recorded, speed response to a particular applied real power.

FIG. 10 shows an actual, recorded, speed response to a particular applied real power input. The generator real power and speed response are shown as per unit values. Based on these responses, an equivalent linear speed control system was identified, as described above. The Estimated LAF programmable parameter values of the identified equivalent linear speed control system are shown in Table 3.

TABLE 3

Estimation of the LAF Parameters

| | H | $T_A$ | $K_P$ | $K_I$ | $K_D$ | Droop |
|---|---|---|---|---|---|---|
| Model | 0.1 | 0.01 | 2 | 4 | 1 | 0 |
| Estimated | 0.21 | 0.21 | 1.85 | 3.65 | 0.96 | 0 |

Figure 11:
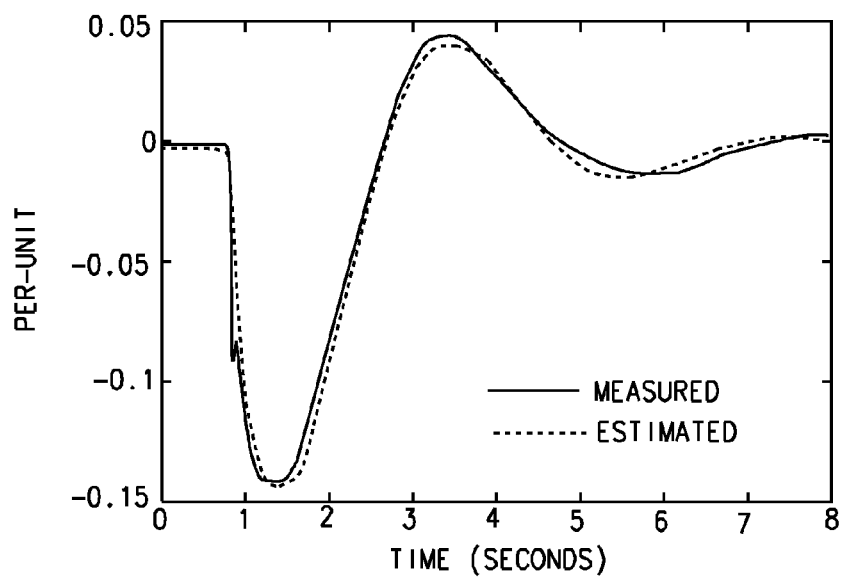
FIG. 11 shows the time response of an equivalent linear speed control system compared to the time response predicted by a simulated model of the diesel genset, according to an exemplary embodiment.

The Estimated LAF programmable parameter values are somewhat different from Model parameter values. The difference can result from nonlinear functions present in the alternator-rectifier exciter and engine RTDS models. FIG. 11 shows the actual, recorded, speed response from FIG. 10, and the speed response of the equivalent linear control system using the Estimated parameters shown in FIG. 3. Despite the differences between the Model and Estimated LAF programmable parameter values, the time response of equivalent linear speed control system is very close to the actual, recorded, speed response, as illustrated in FIG. 11.

TABLE 4

Estimation of the LAF Parameters

| | |
|---|---|
| Wash-out Time constant, $T_{LA}$ | 0.4 |
| Output Gain, $K_{LA}$ | 0.7 |
| Phase Lead time constant, $T_{LD}$ | 0.5 |
| Phase lag time constant, $T_{LG}$ | 0.01 |

Figure 12:
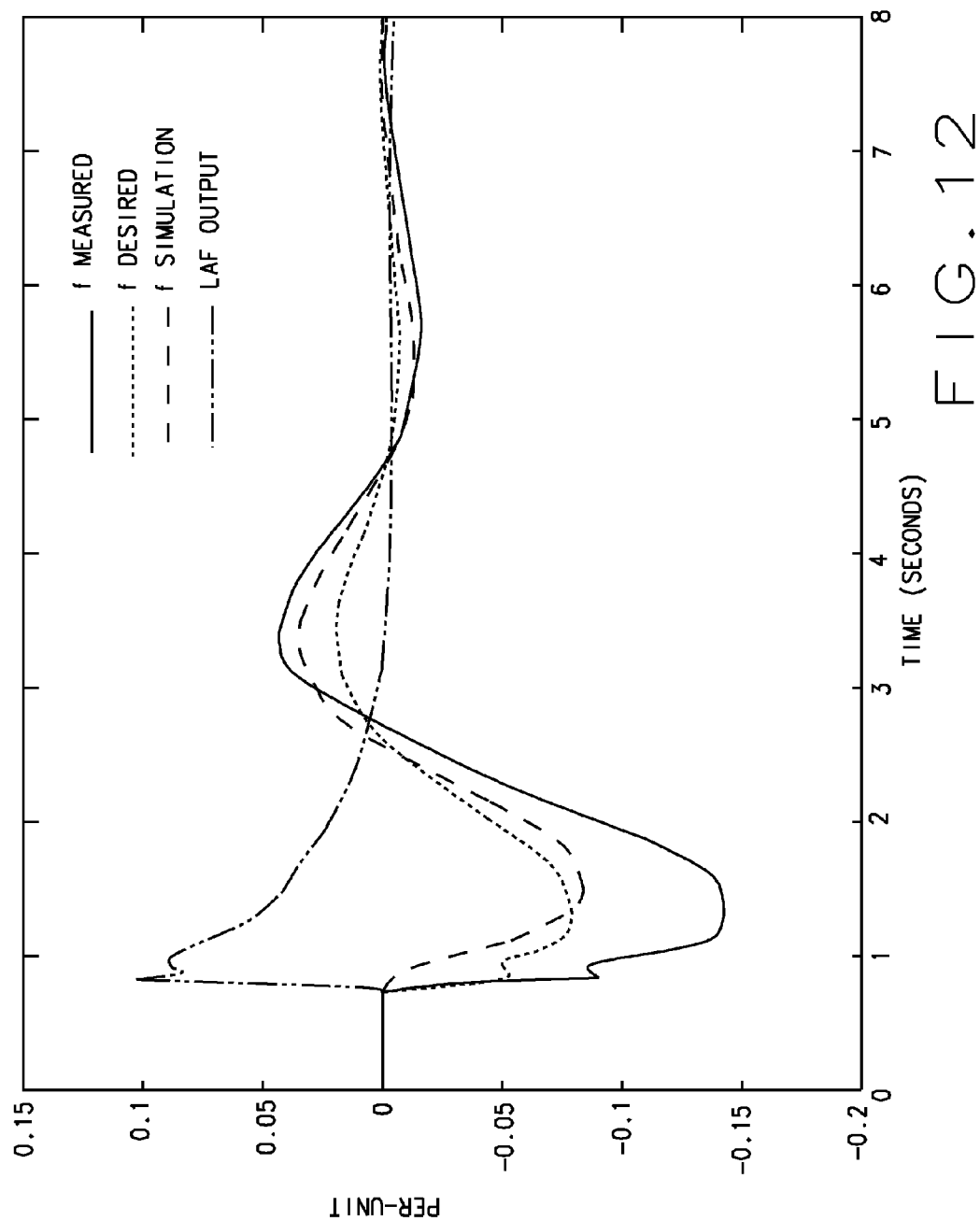
FIG. 12 illustrates the output of the LAF, and the desired, measured, and simulated speed responses of the diesel genset 10, to a step real power input, according to an exemplary embodiment.

FIG. 12 illustrates the output of the LAF, and the desired, measured, and simulated speed responses of the diesel genset 10, to a step real power input are shown. The measured speed response, f measured, shown is the recorded, actual, speed response shown in FIGS. 10-11. The desired speed response, f desired, can be obtained by obtained by multiplying the measured speed response, f measured, by $K_{desired}=0.5$, or an otherwise suitable value to produce a speed deviation which meets or exceeds the requirements of ISO8528-5. The RTDS, with the LAF activated, can be used to determine the simulated system speed response, f simulation. The LAF output is also shown magenta. For purposes of the simulation, the LAF output can be calculated with the recorded real power which was obtained with LAF inactive. In this case, the actual response with LAF active will be slightly different since the speed response is affected by the LAF. As can be seen from FIG. 12, the speed response with the LAF activated, f simulation, closely approximates the desired speed response, f desired.

Figure 13:
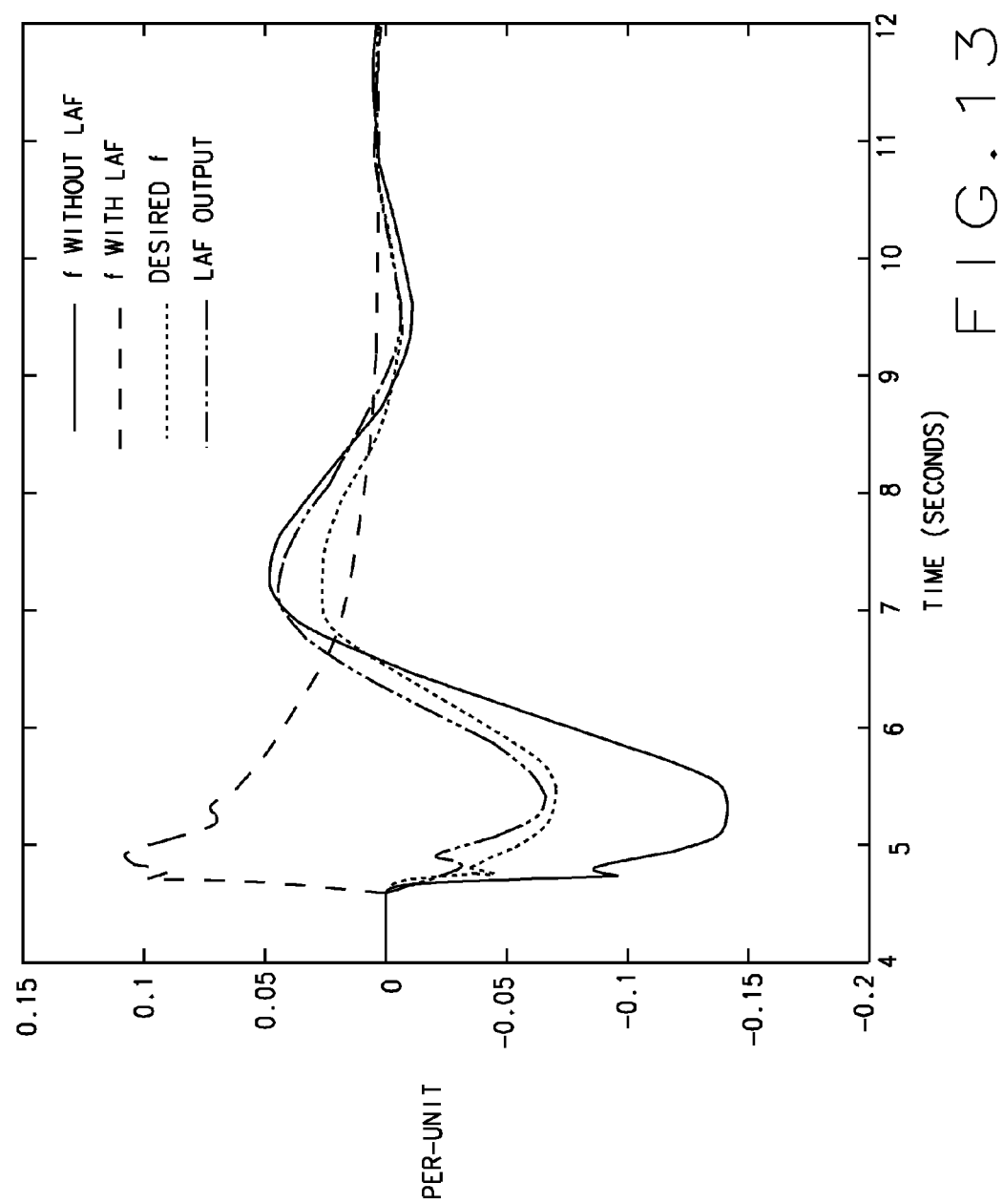
FIG. 13 shows the output of the LAF with the LAF parameters tuned by the PSO method as described above, a desired speed response, and the speed response with and without the LAF, to a step real power input, according to an exemplary embodiment.

FIG. 13 shows the effect of tuning the LAF programmable parameters, using the PSO method as described above. The output of the LAF the desired speed response, f desired, and the speed response with and without the LAF, to a step real power input are shown. As can be seen from FIGS. 12-13, the speed response with the LAF tuned parameters, f with LAF, shown in FIG. 13 even more closely approximates the desired speed response, f desired, than the speed response with a LAF using parameters before tuning, f simulation, from FIG. 12.

In an illustrative embodiment, the LAF and the PSO tuning method were implemented using a typical Diesel-Generating Set, including a 125 kVA, 208 Vac, 1800 RPM, 3φ synchronous generator. The no load excitation for this generator was provided by a self-excited 0.3 Amp, 7 Vdc, ac exciter.

A real power load of 100 kW was applied to the Diesel-Generating Set. In order to find a proper set of the LAF parameters, the diesel engine speed deviation was recorded in response to the applied load. An equivalent speed system was identified as described above. The resulting Estimated programmable parameter values of the equivalent linear speed system parameters are shown in Table 5.

TABLE 5

Estimation of the Equivalent Linear Speed Control System

| | H | $T_A$ | $K_P$ | $K_I$ | $K_D$ | Droop |
|---|---|---|---|---|---|---|
| Estimated | 0.404 | 0.01 | 2.65 | 8.31 | 0.575 | 0.001 |

Based on the identified equivalent speed system parameters, the LAF parameters are calculated and shown in Table 6.

TABLE 6

Estimation of the LAF Programmable Parameters

| | |
|---|---|
| Wash-out Time constant, $T_{LA}$ | 0.203 |
| Output Gain, $K_{LA}$ | 0.340 |

TABLE 6-continued

Estimation of the LAF Programmable Parameters

| | |
|---|---|
| Phase Lead time constant, $T_{LD}$ | 0.001 |
| Phase lag time constant, $T_{LG}$ | 0.201 |

Similar results as to those obtained with the RTDS were obtained using the Diesel-Generating Set. The speed deviation of the Diesel-Generating Set without the LAF exceeds the ISO85285-2 speed requirement of a 10% speed drop. With the LAF activated, its desired speed deviation with $K_{desired}=0.5$ is easily achieved, resulting in a speed deviation well within the ISO85285-2 requirements.

Computer Operating Environment

Figure 14:
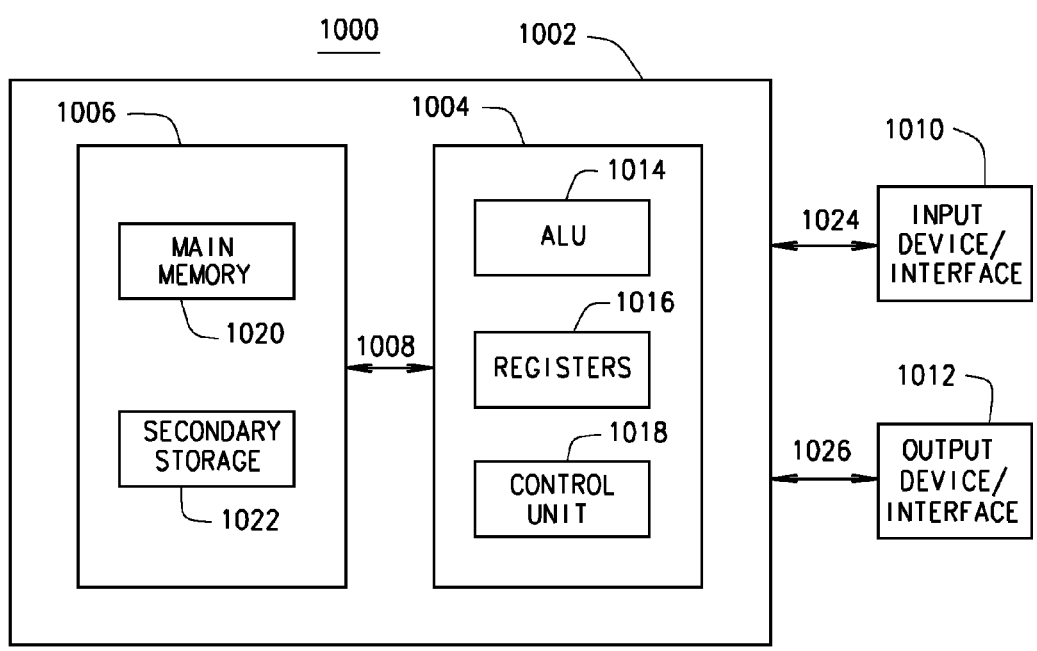
FIG. 14 is a block diagram of a computer system suitable for use with the LAF systems and methods, according to various embodiments.

Referring to FIG. 14, an operating environment for an illustrated embodiment of a system and/or method for an AVR or speed governor including the LAF systems and methods as described herein is a computer system 1000 with a computer 1002 that comprises at least one high speed central processing unit (CPU) 1004, in conjunction with a memory system 1006 interconnected with at least one bus structure 1008, an input device 1010, and an output device 1012. These elements are interconnected by at least one bus structure 1008. In an alternative embodiment, the LAF systems and methods can be implemented in a stand-alone device, or incorporated into another component in the system which provides the just-described operating environment.

The computer 1002 can include an input data interface for receiving a measurement of the real power load applied to the diesel generating set, and a communications interface that can be operatively coupled to the communications interface of the speed governor 18. The communications interface of the computer 1002 can transmit a control output to the communications interface of the speed governor 18.

As addressed above, the input and output devices can include a communication interface including a graphical user interface. Any or all of the computer components of the network interface and communications systems and methods can be any computing device including, but not limited to, a lap top, PDA, Cell/mobile phone, as well as potentially a dedicated device. The software can be implemented as any "app" thereon and still be within the scope of this disclosure.

The illustrated CPU 1004 is of familiar design and includes an arithmetic logic unit (ALU) 1014 for performing computations, a collection of registers 1016 for temporary storage of data and instructions, and a control unit 1018 for controlling operation of the computer system 1000. Any of a variety of micro-processors are equally preferred but not limited thereto, for the CPU 1004. This illustrated embodiment operates on an operating system designed to be portable to any of these processing platforms.

The memory system 1006 generally includes high-speed main memory 1020 in the form of a medium such as random access memory (RAM) and read only memory (ROM) semiconductor devices that are typical on a non-transient computer recordable medium. The present disclosure is not limited thereto and can also include secondary storage 1022 in the form of long term storage mediums such as floppy disks, hard disks, tape, CD-ROM, flash memory, etc., and other devices that store data using electrical, magnetic, and optical or other recording media. The main memory 1020 also can include, in some embodiments, a video display memory for displaying images through a display device (not shown). Those skilled in the art will recognize that the memory system 1006 can comprise a variety of alternative components having a variety of storage capacities.

Where applicable, an input device 1010, and output device 1012 can also be provided in the system as described herein or embodiments thereof. The input device 1010 can comprise any keyboard, mouse, physical transducer (e.g. a microphone), and can be interconnected to the computer 1002 via an input interface 1024, such as a graphical user interface, associated with or separate from the above described communication interface including the antenna interface for wireless communications. The output device 1012 can include a display, a printer, a transducer (e.g. a speaker), etc, and be interconnected to the computer 1002 via an output interface 1026 that can include the above described communication interface including the antenna interface. Some devices, such as a network adapter or a modem, can be used as input and/or output devices.

As is familiar to those skilled in the art, the computer system 1000 further includes an operating system and at least one application program. The operating system is the set of software which controls the computer system's operation and the allocation of resources. The application program is the set of software that performs a task desired by the system and method of the LAF and or any of the above described processes and process steps using computer resources made available through the operating system.

In accordance with the practices of persons skilled in the art of computer programming, the present disclosure is described below with reference to symbolic representations of operations that are performed by the computer system 1000. Such operations are sometimes referred to as being computer-executed. It will be appreciated that the operations which are symbolically represented include the manipulation by the CPU 1004 of electrical signals representing data bits and the maintenance of data bits at memory locations in the memory system 1006, as well as other processing of signals. The memory locations where data bits are maintained are physical locations that have particular electrical, magnetic, or optical properties corresponding to the data bits. One or more embodiments can be implemented in tangible form in a program or programs defined by computer executable instructions that can be stored on a computer-readable medium. The computer-readable medium can be any of the devices, or a combination of the devices, described above in connection with the memory system 1006.

The foregoing disclosure thus discloses multiple systems and methods which can be made up of various elements and steps which may or may not be present in any particular system or method to be used at particular time or in a particular setting, and thus discloses many permutations of systems and methods. The foregoing disclosure allows for variation and selection of features, elements and steps depending upon the user or users.

We claim:

1. A method for providing a load anticipation feature for a diesel generating set including a diesel engine, a generator, a speed governor, and an automatic voltage regulator, the method comprising steps of:
    determining using particle swarm optimization, by a computer data processor, an equivalent linear speed control system, a response of the equivalent linear speed control system approximately matching a non-linear speed response of the diesel generating set, by:
        determining an actual value of the non-linear speed response of the diesel generating set based on a real power load;

calculating a response of the equivalent linear speed control system using the real power load and a speed deviation;

determining a first fitness evaluation to find a self best value for each particle in a group of linear speed control particles and a global best value of the group of linear speed control particles by comparing the calculated response to the actual value of the nonlinear speed response;

determining, using the particle swarm optimization, by the computer data processor, at least one programmable parameter of the load anticipation feature based on the real power load applied to the diesel generating set and a desired speed response of the linear speed control system by:

determining a desired speed response, $\Delta\omega_d(k)$, of the linear speed control system using a real power output, $P_E(k)$, over a predetermined period of time;

calculating a response of the equivalent linear speed control system and the load anticipation feature, $\Delta\omega_m(k)$, based on the real power output;

determining a second fitness evaluation of the particle to find a self best value for each particle in a group of load anticipation feature particles and a global best value of the group of load anticipation feature particles by comparing the desired speed response to the calculated response of the equivalent linear speed control system and the load anticipation feature;

measuring the real power load applied to the diesel generating set by a sensor electrically coupled to the diesel generating set;

determining, by the automatic voltage regulator, a control output based on the measured real power load and the at least one programmable parameter of the load anticipation feature; and controlling the speed governor, by the automatic voltage regulator, the speed governor adjusting the speed of the diesel engine based on the control output.

2. The method of claim 1 wherein the step of determining the equivalent linear speed control system further comprises a step of determining a set of programmable parameters of the linear speed control system using particle swarm optimization, the set of programmable parameters determined by a predetermined number of particles, wherein a position of each particle represents a different set of programmable parameters; and further comprises steps of, for each particle:
a. initializing each particle position;
b. determining an actual value of the speed response of the diesel generating set based on a generator real power load;
c. calculating a response of the equivalent linear speed control system with a selected particle position using a generator real power load and the speed deviation;
d. determining the first fitness evaluation of the particle to find a self best value for each particle and a global best value of all of the predetermined number of particles by comparing the calculated response to the actual value of the speed response; and
e. updating the particle position and a velocity for each particle based on the determined self best value and global best value.

3. The method of claim 2 wherein the set of programmable parameters of the equivalent linear speed control system comprise at least one of: H=total engine inertia, $T_A$=actuator time constant, $K_P$, $K_I$, $K_D$=(PID) controller parameters and Speed Droop.

4. The method of claim 1 wherein the step of determining the linear speed control system further comprises steps of:
determining a set of programmable parameters of the equivalent linear speed control system using particle swarm optimization, the set of programmable parameters determined by a fixed number of particles, wherein a position of each particle represents a different set of programmable parameters; and
for each set of programmable parameters:
Step 0: initializing Iteration Counter=0;
Step 1: determining an actual speed control system, $\Delta\omega(k)$, for the diesel engine using the real power output, $P_E(k)$, of the generator as a predetermined number of samples, k=1, ..., N, over a predetermined period of time;
Step 2: initializing each particle position to typical values based on the specifications of the equipment in the diesel generating set and each particle velocity to zero;
Step 3: initializing Particle Counter=0;
Step 4: calculating the equivalent linear speed control system response, $\Delta\omega_m(k)$, with a selected particle position, based on the real power output, $P_E(k)$, k=1, ..., N;
Step 5: calculating the first fitness function:

$$J = \sum_{k=1}^{N} (\Delta\omega(k) - \Delta\omega_m(k))^2$$

to choose the best $x_n^{self}$ value based on the actual speed control system response and equivalent linear speed control system model's response;

Step 6: Finding the best $x_n^{self}$ value of the particle, updating the $x^{global}$ value and updating a new particle position and velocity using equations:

$$v_{k+1} = \alpha v_k + \beta_1 \text{rand}_1(x_k^{self} - x_k) + \beta_2 \text{rand}_2(x^{global} - x_k)$$

$$x_{k+1} = x_k + v_k$$

Step 7: until all particles are calculated based on the Particle Counter and the predetermined number of particles, incrementing the Particle Counter and repeating steps 4-6 above for each particle;
Step 8: If the Particle Counter is equal to the total Number of Particles in the set of programmable parameters, going to Step 9; If not, going to Step 4;
Step 9: Incrementing the Iteration Counter; and
Step 10: If the Iteration Counter is less than or equal to a predetermined Maximum Number of Iterations, going to Step 3.

5. The method of claim 4 wherein the set of programmable parameters of the equivalent linear speed control system comprise at least one of: H=total engine inertia, $T_A$=actuator time constant, $K_P$, $K_I$, $K_D$=(PID) controller parameters and Speed Droop.

6. The method of claim 1 wherein the step of determining at least one programmable parameter of the load anticipation feature further comprises a step of determining a set of programmable parameters of the load anticipation feature using particle swarm optimization, the set of programmable parameters determined by a predetermined number of particles; and for each particle:
  a. initializing a particle position;
  b. determining a desired speed response of the equivalent linear speed control system based on the generator rated real power load;
  c. calculating a speed response of the linear speed control system and the load anticipation feature with a selected particle position using the real power load and the speed deviation;
  d. determining the second fitness evaluation of the particle to find a self best value and a global best value by comparing the calculated speed response to the desired speed response; and
  e. updating the position and a velocity for each particle based on the determined self best value and global best value.

7. The method of claim 6 wherein the set of programmable parameters of the load anticipation feature comprise at least one of: $T_W$=washout time constant, $K_W$=output gain, $T_{LEAD}$=phase lead constant, and $T_{LAG}$=lag time constant.

8. The method of claim 1 wherein the step of determining at least one programmable parameter of the load anticipation feature further comprises a step of:
  determining a set of programmable parameters of the load anticipation feature using particle swarm optimization, the set of programmable parameters determined by a fixed number of particles, wherein a position of each particle represents a different set of programmable parameters; and
  for each set of programmable parameters:
    Step 0: initializing the Iteration Counter=0;
    Step 1: determining a desired speed response, $\Delta\omega_d(k)$, of the linear speed control system using the real power output, $P_E(k)$, as a predetermined number of samples, k=1, ..., N, over a predetermined period of time;
    Step 2: initializing each particle position and each particle velocity to zero;
    Step 3: initializing Particle Counter=0;
    Step 4: calculating the response of the equivalent linear speed control system and the load anticipation feature, $\Delta\omega_m(k)$, with a selected particle position, based on the real power output, $P_E(k)$, k=1, ..., N;
    Step 5: calculating the second fitness function:

$$J = \sum_{k=1}^{N} (\Delta\omega_d(k) - \Delta\omega_m(k))^2$$

to choose the best $x_n^{self}$ if value based on the equivalent linear speed control system and the load anticipation feature response and the desired speed response;
    Step 6: Finding the best $x_n^{self}$ value of the particle, updating the $x^{global}$ value and updating a new particle position and velocity using equations:

$$v_{k+1} = \alpha v_k + \beta_1 \text{rand}_1(x_k^{self} - x_k) + \beta_2 \text{rand}_2(x^{global} - x_k)$$

$$x_{k+1} = x_k + v_k$$

Step 7: until all particles are calculated based on the Particle Counter and the predetermined number of particles, incrementing the Particle Counter and repeating steps 4-6 above for each particle;
    Step 8: If the Particle Counter is equal to the total Number of Particles in the set of programmable parameters, going to Step 9; If not, going to Step 4;
    Step 9: Incrementing the Iteration Counter; and
    Step 10: If the Iteration Counter is less than or equal to a predetermined Maximum Number of Iterations, going to Step 3.

9. The method of claim 8 wherein the set of programmable parameters of the load anticipation feature comprise at least one of: $T_W$=washout time constant, $K_W$=output gain, $T_{LEAD}$=phase lead constant, and $T_{LAG}$=lag time constant.

10. The method of claim 1 wherein the desired speed response, $\Delta\omega_d(k)$, of the equivalent linear speed control system is determined based on a scaling factor and the actual speed response of the diesel generating set.

11. The method of claim 1 wherein the step of controlling the speed governor further comprises a step of blocking the control output to the speed governor when the measured real power load is less than or equal to a predetermined percentage of the generator's rated power load.

12. The method of claim 1 wherein the step of controlling to the speed governor further comprises a step of enabling the control output to the speed governor when a rate of change of the real power load exceeds a programmable amount.

13. The method of claim 1 wherein the step of determining, using the particle swarm optimization, the at least one programmable parameter of the load anticipation feature is performed by the automatic voltage regulator.

14. A system for providing a load anticipation feature for a diesel generating set including a diesel engine, a generator, a speed governor, and an automatic voltage regulator, the system comprising:
  a computer data processor apparatus operatively coupled to a non-transitory computer memory containing computer executable instructions, that when executed by one or more processors, cause the one or more processors to:
    determine, using particle swarm optimization, an equivalent linear speed control system, a response of the linear speed control system approximately matching the non-linear speed response of the diesel generating set by:
    determining an actual value of the non-linear speed response of the diesel generating set based on a real power load;
    calculating a response of the equivalent linear speed control system using the real power load and a speed deviation;
    determining a first fitness evaluation to find a self best value for each particle in a group of linear speed control particles and a global best value of the group of linear speed control particles by comparing the calculated response to the actual value of the non-linear speed response;
    determine, using the particle swarm optimization, at least one programmable parameter of the load anticipation feature based on a real power load applied to the diesel generating set and a desired speed response of the linear speed control system by:
    determining a desired speed response, $\Delta\omega_d(k)$, of the linear speed control system using the real power output, $P_E(k)$, over a predetermined period of time;

calculating a response of the equivalent linear speed control system and the load anticipation feature, $\Delta\omega_m(k)$, based on the real power output;

determining a second fitness evaluation of the particle to find a self best value for each particle in a group of load anticipation feature particles and a global best value of the particles in a group of load anticipation feature particles by comparing the desired speed response to the response of the equivalent linear speed control system and the load anticipation feature; and implement the linear speed control system and the load anticipation feature;

a sensor to measure the real power load applied to the diesel generating set;

an input data interface structure for receiving a measurement of the real power load applied to the diesel generating set, the automatic voltage regulator having an automatic voltage regulator computer data processor apparatus having an automatic voltage regulator communications interface and operatively coupled to an automatic voltage regulator non-transitory computer memory containing automatic voltage regulator computer executable instructions, the automatic voltage regulator computer data processor apparatus for executing the automatic voltage regulator computer executable instructions to generate a control output based on the measured real power load and the at least one programmable parameter of the load anticipation feature; and the speed governor including a communications interface operatively coupled to the communications interface of the automatic voltage regulator computer data processor apparatus, the speed governor communications interface receiving the automatic voltage regulator control output transmitted from the computer data processor apparatus communications interface, the speed governor adjusting the speed of the diesel engine based on the control output.

15. The system of claim 14 wherein the computer executable instructions that when executed by one or more processors, cause the one or more processors to determine the linear speed control system, further causes the one or more processors to:

determine a set of programmable parameters of the equivalent linear speed control system using the particle swarm optimization, the set of programmable parameters determined by a predetermined number of particles, wherein the position of each particle represents a different set of programmable parameters; and for each particle:

a. initializing each particle position;

b. determining an actual value of the speed response of the diesel generating set based on a generator real power load;

c. calculating a response of the equivalent linear speed control system with a selected particle position using the real power load and the speed deviation;

d. determining the first fitness evaluation of the particle to find a self best value for each particle and a global best value of all of the predetermined number of particles by comparing the calculated response to the actual value of the speed response; and e. updating the particle position and a velocity for each particle based on the determined self best value and global best value.

16. The system of claim 15 wherein the set of programmable parameters of the equivalent linear speed control system comprise at least one of: H=total engine inertia, $T_A$=actuator time constant, $K_P$, $K_I$, $K_D$=(PID) controller parameters and Speed Droop.

17. The system of claim 14 wherein the computer executable instructions that when executed by one or more processors, cause the one or more processors to determine the linear speed control system, further causes the one or more processors to:

determine a set of programmable parameters of the linear speed control system using particle swarm optimization, the set of programmable parameters determined by a fixed number of particles, wherein the position of each particle represents a different set of programmable parameters; and for each set of programmable parameters:

Step 0: initializing Iteration Counter=0;

Step 1: determining an actual speed control system, $\Delta\omega(k)$, for the diesel engine using the real power output, $P_E(k)$, of the generator as a predetermined number of samples, k=1, ..., N, over a predetermined period of time;

Step 2: initializing each particle position to typical values based on the specifications of the equipment in the diesel generating set and each particle velocity to zero;

Step 3: initializing Particle Counter=0;

Step 4: calculating the equivalent linear speed control system response, $\Delta\omega_m(k)$, with a selected particle position, based on the real power output, $P_E(k)$, k=1, ..., N;

Step 5: calculating the first fitness function:

$$J = \sum_{k=1}^{N} (\Delta\omega(k) - \Delta\omega_m(k))^2$$

to choose the best $x_n^{self}$ value based on the actual speed control system response and equivalent linear speed control system model's response;

Step 6: Finding the best $x_n^{self}$ value of the particle, updating the $x^{global}$ value and updating a new particle position and velocity using equations:

$$v_{k+1} = \alpha v_k + \beta_1 \text{rand}_1(x_k^{self} - x_k) + \beta_2 \text{rand}_2(x^{global} - x_k)$$

$$x_{k+1} = x_k + v_k$$

Step 7: until all particles are calculated based on the Particle Counter and the predetermined number of particles, incrementing the Particle Counter and repeating steps 4-6 above for each particle;

Step 8: If the Particle Counter is equal to the total Number of Particles in the set of programmable parameters, going to Step 9; If not, going to Step 4;

Step 9: Incrementing the Iteration Counter; and

Step 10: If the Iteration Counter is less than or equal to a predetermined Maximum Number of Iterations, going to Step 3.

18. The system of claim 17 wherein the set of programmable parameters of the equivalent linear speed control system comprise at least one of: H=total engine inertia, $T_A$=actuator time constant, $K_P$, $K_I$, $K_D$=(PID) controller parameters and Speed Droop.

19. The system of claim 14 wherein the computer executable instructions that when executed by one or more processors, cause the one or more processors to determine at least one programmable parameter of the load anticipation feature, further cause the one or more processors to:
   determine a set of programmable parameters of the load anticipation feature using particle swarm optimization, the set of programmable parameters determined by a predetermined number of particles; and
   for each particle:
   a. initializing a particle position,
   b. determining a desired speed response of the equivalent linear speed control system based on the generator rated real power load;
   c. calculating a speed response of the linear speed control system and the load anticipation feature with a selected particle position using the real power load and the speed deviation;
   d. determining the second fitness evaluation of the particle to find a self best value for each particle and a global best value of all of the predetermined number of particles by comparing the calculated speed response to the desired speed response; and
   e. updating the particle position and a velocity for each particle based on the determined self best value and global best value.

20. The system of claim 19 wherein the set of programmable parameters of the load anticipation feature comprise at least one of: $T_W$=washout time constant, $K_W$=output gain, $T_{LEAD}$=phase lead constant, and $T_{LAG}$=lag time constant.

21. The system of claim 14 wherein the computer executable instructions that when executed by one or more processors, cause the one or more processors to determine at least one programmable parameter of the load anticipation feature, further cause the one or more processors to:
   determine a set of programmable parameters of the load anticipation feature using particle swarm optimization, the set of programmable parameters determined by a fixed number of particles, wherein the position of each particle represents a different set of programmable parameters; and
   for each set of programmable parameters:
   Step 0: initializing the Iteration Counter=0;
   Step 1: determining a desired speed response, $\Delta\omega_d(k)$, of the linear speed control system using the real power output, $P_E(k)$, as a predetermined number of samples, k=1, ..., N, over a predetermined period of time;
   Step 2: initializing each particle position and each particle velocity to zero;
   Step 3: initializing Particle Counter=0;
   Step 4: calculating the response of the equivalent linear speed control system and the load anticipation feature, $\Delta\omega_m(k)$, with a selected particle position, based on the real power output, $P_E(k)$, k=1, ..., N;
   Step 5: calculating the second fitness function:

$$J = \sum_{k=1}^{N} (\Delta\omega_d(k) - \Delta\omega_m(k))^2$$

to choose the best $x_n^{self}$ if value based on the equivalent linear speed control system and the load anticipation feature response and the desired speed response;
   Step 6: Finding the best $x_n^{self}$ value of the particle, updating the $x^{global}$ value and updating a new particle position and velocity using equations:

$$v_{k+1} = \alpha v_k + \beta_1 \mathrm{rand}_1(x_k^{self} - x_k) + \beta_2 \mathrm{rand}_2(x^{global} - x_k)$$

$$x_{k+1} = x_k + v_k$$

Step 7: until all particles are calculated based on the Particle Counter and the predetermined number of particles, incrementing the Particle Counter and repeating steps 4-6 above for each particle;
   Step 8: If the Particle Counter is equal to the total Number of Particles in the set of programmable parameters, going to Step 9; If not, going to Step 4;
   Step 9: Incrementing the Iteration Counter; and
   Step 10: If the Iteration Counter is less than or equal to a predetermined Maximum Number of Iterations, going to Step 3.

22. The system of claim 21 wherein the set of programmable parameters of the load anticipation feature comprise at least one of: $T_W$=washout time constant, $K_W$=output gain, $T_{LEAD}$=phase lead constant, and $T_{LAG}$=lag time constant.

23. The system of claim 14 wherein the desired speed response, $\Delta\omega_d(k)$, of the equivalent linear speed control system is determined based on a scaling factor and the actual speed response of the diesel generating set.

24. The system of claim 14 wherein the computer executable instructions, that when executed by the one or more processors, cause the one or more processors further to provide the control output to the speed governor further comprises a step of blocking the control output to the speed governor when the measured real power load is less than or equal to a predetermined percentage of the generator's rated power load.

25. The system of claim 14 wherein the computer executable instructions, that when executed by the one or more processors, cause the one or more processors further to enable the transmission of the control output to the speed governor when the rate of change of the real power load applied to the diesel generating set exceeds a programmable amount.

26. The system of claim 14 wherein the automatic voltage regulator computer data processor apparatus includes the computer data processor apparatus.

* * * * *

UNITED STATES PATENT AND TRADEMARK OFFICE
CERTIFICATE OF CORRECTION

PATENT NO.           : 9,574,511 B2                             Page 1 of 1
APPLICATION NO.      : 14/718504
DATED                : February 21, 2017
INVENTOR(S)          : Kiyong Kim and Jeffrey A. Burnworth It is certified that error appears in the above-identified patent and that said Letters Patent is hereby corrected as shown below:

In the Claims

Column 17, Line 52:
Replace "to choose the best $x_n^{self}$ if value based"
With --"to choose the best $x_n^{self}$ value based"--

Column 22, Line 8:
Replace "to choose the best $x_n^{self}$ if value based"
With --"to choose the best $x_n^{self}$ value based"--

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*